United States Patent [19]

Martinis

[11] Patent Number: 5,934,077
[45] Date of Patent: Aug. 10, 1999

[54] MECHANICAL SUPPORT FOR A TWO PILL ADIABATIC DEMAGNETIZATION REFRIGERATOR

[75] Inventor: John M. Martinis, Boulder, Colo.

[73] Assignee: The United States of America as Represented by the Secretary of Commerce, Washington, D.C.

[21] Appl. No.: 08/900,982

[22] Filed: Jul. 25, 1997

[51] Int. Cl.[6] ..................................................... F25B 21/00
[52] U.S. Cl. ....................................................... 62/3.1; 62/6
[58] Field of Search ................................... 62/3.1, 467, 6

[56] References Cited

U.S. PATENT DOCUMENTS

| | | | |
|---|---|---|---|
| 4,785,636 | 11/1988 | Hakuraku et al. | 62/3 |
| 5,156,003 | 10/1992 | Yoshiro et al. | 62/3.1 |
| 5,381,664 | 1/1995 | Bennett et al. | 62/3.1 |

OTHER PUBLICATIONS

Miedema, A.R. and Mess, K.W. (1964), "Observation of a Phonon Bottleneck in $CuCs_2(SO_4)_2 6H_2O$ at Temperatures Near 0.1°K," Physica 30:1849–1862.

Vilches, O.E. and Wheatley, J.C. (1966), "Techniques for Using Liquid Helium in Very Low Temperature Apparatus," The Review of Scientific Instruments 37(7):819–831.

Mess, K.W. et al. (1967), "Magnetic Properties and Spin–Lattice Relaxation of $CoCs_3Cl_5$ and $CoCs_3Br_5$," Physica 34:126–148.

Mess, K.W. et al. (1969), "Thermal and Magnetic Properties of Cerium Magnesium Nitrate Below 1K," Physica 41:260–288.

Hunik, R. et al. (1978), "Two Stage Nuclear Demagnetization Experiments," J. Phys. 39(8):C6–1155–C6–1156.

Hagmann, C. and Richards, P.L. (1994), "Two–stage magnetic refrigerator for astronomical applications with reservoir temperatures above 4 K," Cryogenics 34(3):221–226.

National Inst. of Standards and Technol. EEEL 1995 Technical Accomplishments Brochure, 3pp.

Hepburn, I.D. et al. (1995), "Adiabatic Demagnetisation Refrigerators for Future Sub–Millimetre Space Missions," Space Sci. Rev. 74:215–223.

P.M. Berglund, G.J. Ehnholm, R.G. Gylling, O.V. Lounasmaa, and R.P. Sovik; "Nuclear Refrigeration of Copper"; Cryogenics, vol. 12, No. 4, pp. 297–299, Aug. 1972.

*Primary Examiner*—Christopher B. Kilner
*Attorney, Agent, or Firm*—Greenlee, Winner and Sullivan

[57] ABSTRACT

This invention provides a mechanical support for a two-pill Adiabatic Demagnetization Refrigerator (ADR). The support utilizes a suspension of the two pills from one side of the magnet bore only. In the two pill ADR, the thermal ground is at 4K, a guard pill positioned in the front of the bore cools to 1K and a base pill positioned in the back of the bore cools to 50–100 mk. A connector rod of the base pill traverses the guard pill, and connector rods to both the guard pill and base pill exit through the front aperture. A preferred embodiment of the two-pill support for the front loaded magnet bore utilizes planar support modules comprising three members connected by Kevlar strings. Each member is thermally connected either to one of the pills or to thermal ground. The ground member, the guard member and the base member of the support module are strung with Kevlar threads, such that the base member is suspended only from the guard member, and the guard member only from the ground member. These planar support modules can be aligned and assembled prior to use in an assembly jig. The final assembly of the two-pill support structure using planar support modules is easy and fast.

20 Claims, 7 Drawing Sheets

MECHANICAL SUPPORT FOR A TWO PILL ADIABATIC DEMAGNETIZATION REFRIGERATOR

FIELD OF THE INVENTION

This invention relates to low-temperature technology and provides an improved mechanical support for a two-pill Adiabatic Demagnetization Refrigerator (ADR).

BACKGROUND OF THE INVENTION

The three commonly employed cooling techniques in low-temperature physics and in technologies based on the properties of materials at low temperature are evaporative cooling, for example a pumped helium bath, refrigeration by dilution, in a Dilution Refrigerator, or adiabatic demagnetization, in an Adiabatic Demagnetization Refrigerator (ADR).

In any refrigeration technique there is a need to thermally isolate certain parts of the assembly from the environment, so that those parts may be cooled to, or held at a desired temperature.

While the first two techniques, in principle, allow continuous extraction of heat from a body, adiabatic demagnetization refrigeration is a 'single shot' technique. That is to say, the total heat which can be extracted in a cooling cycle is finite. Therefore great attention needs to be paid to proper thermal isolation, so that low temperatures can be reached and the refrigerator can be held cold over a period of time (hold time) if desired.

ADRs are an important technology for reaching temperatures below 1 Kelvin (K). These refrigerators contain a paramagnetic material, hereafter referred to as a pill, that is placed in a high magnetic field region, typically the bore of a magnet. Cooling is achieved by first thermally clamping the pill to a thermal ground at the starting temperature and by isothermally imposing a large magnetic field on the pill. After the field has been ramped up, the pill is disconnected from the thermal ground. When the field is then reduced, the pill cools. The temperature reached by the pill depends on its magnetic susceptibility and total heat capacity. The total energy available for cooling by the pill is proportional to the susceptibility, the total heat capacity, and the mass of the pill.

Most ADRs start their cooling from a thermal ground of 2 Kelvin which is obtained by pumping on a helium bath. With a pill made from ferric ammonium sulfate, a starting temperature of 2K and a magnetic field of 2 Tesla, a base temperature of 50 mK can be readily achieved. The pill is supported by low thermal conductivity material to isolate it thermally. Typically this is done with Kevlar strings, which are very thin and of low thermal conductivity, thus minimizing the heat leak. At the same time the Kevlar strings are strong enough to support the pill. The use of fine Kevlar threads allows hold times of up to 24 hours which is sufficient for most applications.

One would wish to eliminate the need for a pumped helium bath at 2K and be able to simply use an atmospheric pressure helium bath at a temperature of 4K. However, in order to cool from 4K, a larger initial magnetic field, typically 4 Tesla, is needed. Reliable high-field magnets are commercially available and a 4 Tesla magnet is only slightly more costly than a 2 Tesla magnet. The main disadvantage in this design is the larger heat leak from the starting temperature of 4K to the pill at 50 mK, because this heat leak scales as $T^x$, where T is the temperature of the thermal ground, the exponent x lies between 2 and 3, and the base temperature is assumed to be of order 50–100 mK.

In a recent paper (Cryogenics, v.35, no.3, 224 (1994), which is incorporated by reference herein in its entirety) Hagmann and Richards proposed an apparatus to reach ultra-low temperatures starting from a temperature of 4K. This design has great advantages because pumping on liquid helium is not required which simplifies the apparatus and thus makes it more reliable.

Richards and Hagmann suggested that a refrigerator be constructed of two pills where both pills reside in the bore of a magnet, in contrast to alternative designs where two magnets are used, thus eliminating the need to purchase a second magnet. One pill (base pill) would be of the type typically used in single-pill ADRs, e.g., chromium caesium alum (CCA), and would reach a base temperature of 50 mK. The other pill (guard pill) would be made of gadolinium gallium garnet (GGG), which has a magnetic ordering such that at zero field a temperature of 1K can be reached. The GGG acts as a cold platform to intercept the heat leak from the 4K thermal ground to the 50 mK base pill, thus greatly reducing the heat leak of the pill at base temperature. Because GGG has a high heat capacity, a relatively small amount of material is needed, leaving more room in the magnet bore for the base pill.

Figure 1:
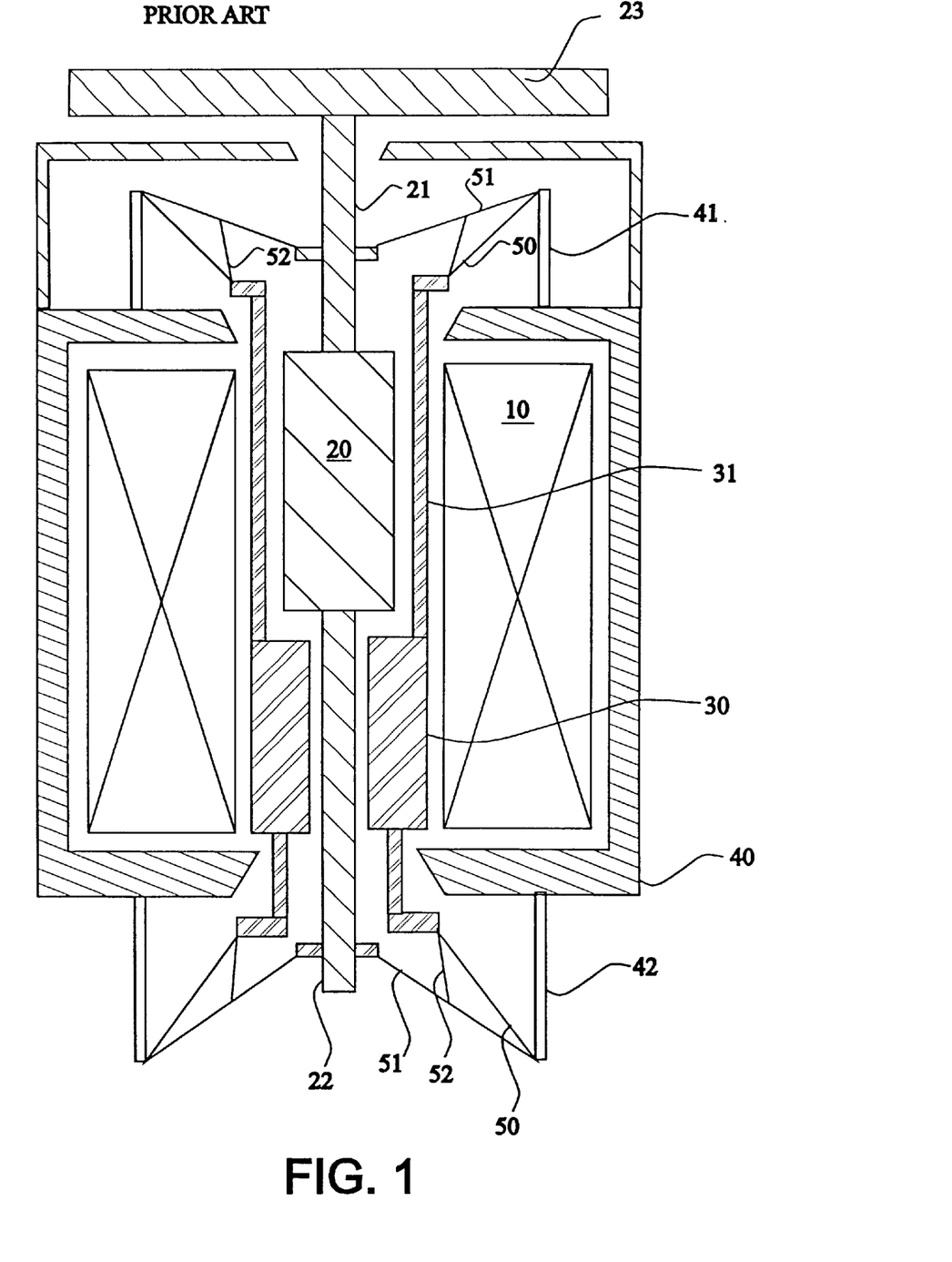
FIG. 1 shows a schematic diagram of the two-pill Adiabatic Demagnetization Refrigerator proposed by Hagmann and Richards (Cryogenics, v.35, no.3, 224 (1994)

FIG. 1 shows the two-pill ADR proposed by Richards and Hagmann. The base pill 20 and guard pill 30 sit inside the bore of a superconducting magnet 10. A magnetic shield 40, hereafter referred to as shield, at 4K surrounds the magnet which itself is also at 4K. The guard pill occupies the lower half of the bore. A thermally conductive hollow cylinder 31 of the diameter of the guard pill is attached to the guard pill and reaches all the way to the top aperture of the bore. This guard pill assembly is suspended at the top and the bottom by Kevlar strings 50 which are attached to a support structures 41 and 42 on the shield at 4K. The base pill is connected to two thermally conductive rods 21, 22 running axially out of the top aperture and the bottom aperture of the magnet and its shield respectively. Rod 21 leads to cold platform 23. The base pill 20 is located inside the volume of the cylinder of the guard pill assembly and the lower rod 22 of the base pill traverses through a clearance in the guard pill. There is no mechanical contact between the two assemblies. The base pill assembly is attached to support structures 41 and 42 by low thermal conductivity Kevlar strings 51. These strings attach indirectly to the shield's thermal ground at 4K. They are thermally intercepted about midway by additional Kevlar strings 52 coming from the guard pill assembly, thus reducing the heat leak from the base pill to the 4K thermal ground. The design of Hagmann and Richards has some inherent disadvantages which are discussed next.

For good thermal conductivity at low temperatures the cylinder connected to the guard pill and surrounding the base pill 31 is preferably a metallic (or at least electrically conductive) tube. A high thermal conductivity is desired to assure that the thermal intercepts 52 on the top of the magnet are at the guard pill temperature. However, an electrically conductive cylinder of large cross section in a magnetic field can develop eddy current problems.

Furthermore the proximity of the thermally very conductive cylinder material at 1K to the base pill at 50 mK and the magnet at 4K increases the chance of mechanical thermal contact with either side or both sides, which would result in immediate failure of the refrigerator due to a massive heat leak.

The volume available to the base pill is also reduced to make room for the cylinder and to allow enough play for the mechanical support so that a mechanical thermal contact may not occur even if the Kevlar string support moves somewhat.

The loss of volume available to the base pill is especially disadvantageous, since for thermodynamic reasons the base pill in ADRs is of low heat capacity and one would wish to use as much base pill material as possible to obtain more cooling power and, in the end, longer hold times.

Another problem is associated with the complexity of the support for the two pills. The need to have two intercepting support strings greatly complicates assembling the refrigerator. Also the ADR's magnet bore needs to be accessible from the top and the bottom to allow stringing of the Kevlar supports.

In view of the danger of a mechanical thermal contact through the cylinder as described above, the pill assemblies need to be very accurately positioned and the strings tensioned very equally. In addition, the strings must stay under proper tension during a cooling cycle and over time to keep the pill assemblies from moving. However, elongation of the Kevlar strings during a cooling cycle or over time, and the contraction of the support structure and of the pill assemblies, when cooled, has been a problem for traditional designs, and therefore complicated tensioning methods have been employed.

Typically Kevlar strings are tensioned at about 25% of their breaking strength which causes the string to elongate by about 1% (for type Kevlar 29). When cooled to 4K and below, Kevlar expands by 0.1%, but metals such as brass, aluminum or copper contract by approximately 0.4%. Furthermore the string length increases (creeps) by about 0.2% a year. Present designs have compensated for this problem by either having a spring tension the strings, or by re-tightening the strings over time.

SUMMARY OF THE INVENTION

This invention provides an improved mechanical support for a two-pill Adiabatic Demagnetization Refrigerator (ADR). The support utilizes a suspension of the two pills from one side of the magnet bore only. This has not been reported previously, probably because it was assumed that a strong and stiff support from only one side of the magnet could not be constructed.

The two-pill assembly of this invention is inserted into the magnet bore through one of the apertures, termed the front aperture, and supported from one side of the magnet only. The other aperture, the back aperture, is not utilized and access to the back aperture is not required. The base pill occupies a volume in the back of the bore, termed the back portion, while the guard pill occupies a volume in the front of the bore, termed the front portion. A connector rod of the base pill, termed the axial base connector, traverses the guard pill, and both the axial base connector and a connector rod of the guard pill, termed the axial guard connector, exit through the front aperture. When no distinction is required the axial base pill connector and the axial guard pill connector are collectively referred to as axial connector rods. As in the design of Hagmann and Richards the volume of the guard pill is somewhat reduced by the axial base connector traversing the guard pill. The great advantage of the design described here is that it eliminates the thermally conductive cylinder (31 in FIG. 1) in the design of Hagmann and Richards and increases the volume in the back portion of the bore available to the base pill. This increased volume for the base pill is advantageous and results in more cooling power and longer hold times.

The elimination of the thermally conductive cylinder greatly reduces the danger of refrigerator failure due to accidental mechanical thermal contact. The alignment of the two-pill assembly only needs to be concerned with the base pill to magnet bore spacing, which at the same time eases the constraints on the rigidity of the support.

From a practical point of view, the entire pill support can be assembled and aligned first, outside the magnet on a bench, and then installed in the magnet bore. Different pill assemblies could be used interchangeably in one magnet, or the magnet can be removed and checked without having to disassemble and realign the entire two-pill assembly. Since no access to the back aperture is required the magnet can simply rest on the back (upside down from the FIG. 2 perspective) without any special mechanical structure.

A preferred embodiment of the two-pill support for the front loaded magnet bore utilizes planar support modules comprising three members connected by Kevlar strings. The ground member (at 4K), the guard member (at 1K) and the base member (at 50 mK) of the support module are strung with Kevlar threads, such that the base member is suspended only from the guard member, and the guard member only from the ground member. Kevlar is a strong, low conductivity plastic, specifically polyparaphenylene terephthalamide. Kevlar thread is preferred, but any low conductivity material can be used. Since the entire assembly is placed in high vacuum during cooling, and no significant thermal conduction comes through vacuum, only conduction through material structures need be considered.

The planar support modules only constrain motion in the plane of the strings, so three or more of these modules are preferred in order to prevent the two-pill assembly from moving. These planar support modules can be aligned and assembled prior to use in an assembly jig. The final assembly of the two-pill support structure using planar support modules is easy and fast.

In a preferred embodiment four planar support modules are used. Two planar support modules constrain the motion of the pills in the plane perpendicular to the axis of the magnet bore, and two planar support modules prevent the two-pill assembly from moving along the axis of the bore. The result is a very stiff support.

One of the relatively flat planar support module can be placed right up against the front aperture of the magnet bore. This shortens the lever arm formed by the two pills and the sections of the axial connector rods extending into the bore of the magnet, which increases the mechanical rigidity. In a preferred embodiment the axial connector rods are long and extend far from the front aperture to the outside allowing precise axial alignment of the two pills inside the magnet bore.

Two rods connected perpendicular to the axial connector rods, termed cross connector rods, form a cross with the axial connector rods and are supported by the remaining two planar support modules. The cross connector rod connected to the axial base connector is termed the cross base connector; the cross connector rod connected to the axial guard connector is termed the cross guard connector. They are collectively referred to as cross connector rods. These cross connector rods are also chosen long for precise alignment.

The axial and cross connector rods also act as extended cold fingers on which a cold stage can be mounted. In the preferred embodiment of this improved two-pill support, an x-ray detector is mounted on a cold finger. Much shorter rods can be utilized, but there is a trade off between the compactness of the support and the alignment precision and mechanical rigidity of the support.

This invention provides preferred material choices for the members of the support module and an optimized stringing of the support module. In the preferred embodiment the attachment points for the strings on the different members were positioned to maximize the Kevlar string length. Since the heat leak of a string scales as 1/L, where L is the length of the string, long string lengths are desired. To compensate for the elongation of the Kevlar strings under cooling the base member is made of copper, the guard member of titanium and the ground member of aluminum. Through the different expansion coefficients of these metals and a careful positioning of the string attachment points on those members a net tensioning of the Kevlar strings under cooling is accomplished, compensating for the elongation of the strings and eliminating the need for spring loaded tensioning systems or other means to take up the string slack under cooling.

BRIEF DESCRIPTION OF THE DRAWING

FIG. 3, comprising FIGS. 3a–b shows the nested members of the planar support module. FIG. 3a shows a plan view and FIG. 3b the cross section AA as shown in FIG. 3a.

FIG. 4, comprising FIGS. 4a–d shows an exploded view of the planar support module.

FIG. 5, comprising FIGS. 5a–b shows the assembled planar support module. The members of the planar support module are strung together by Kevlar strings.

DETAILED DESCRIPTION OF THE INVENTION

Figure 2:
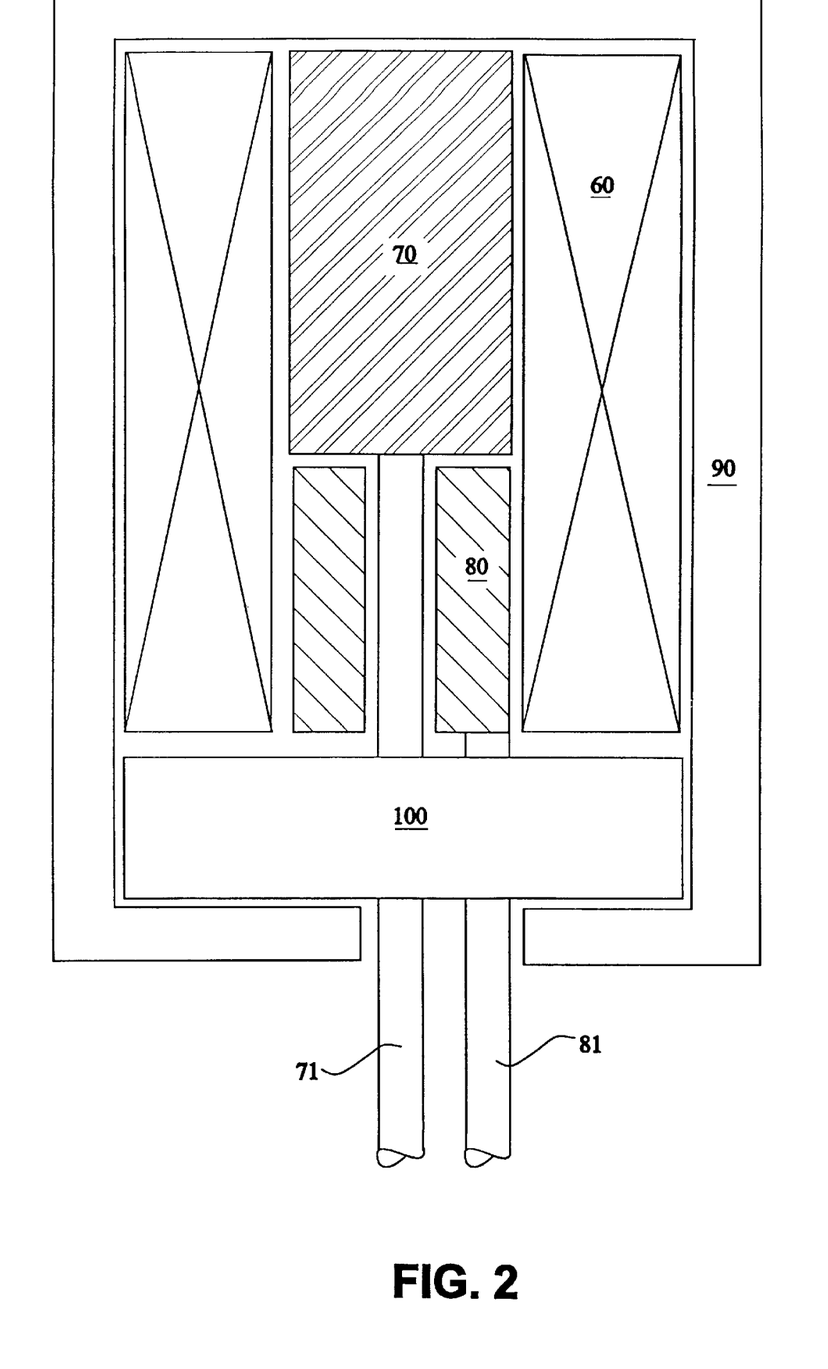
FIG. 2 shows a schematic diagram of the pill support inside the magnet bore for a two-pill ADR utilizing only one magnet aperture.

In a preferred embodiment of this invention of an improved mechanical support for a two-pill Adiabatic Demagnetization Refrigerator (ADR) the positioning of paramagnetic salt pills, the base pill and the guard pill, inside the bore of the ADR's magnet is as shown in FIG. 2. Element 60 is the superconducting magnet, 70 the base pill, 71 the axial base connector, 80 the guard pill, and 81 the axial guard connector. Element 100 is the support structure. In a preferred embodiment, it comprises a planar support module which, in combination with additional planar modules and connectors, forms a preferred support structure, which is not shown in its entirety here. The support structure in this embodiment is positioned within shield 90. It can alternatively be positioned partially or entirely outside the shield.

The two-pill assembly comprising the base pill, the axial base connector, the guard pill, and the axial guard connector is inserted into the bore of the magnet through the front aperture. The assembly is support from one side of the magnet, the front, only. There is no need to access the back of the magnet.

The base pill occupies the back portion of the bore, and in a preferred embodiment it is made of ferric ammonium alum (FAA).The axial base connector, a thermally conductive rod, which in a preferred embodiment is a ¼ inch oxygen free high conductivity (OFHC) copper rod, supports the base pill and makes good thermal contact with the pill. The axial base connector is guided through a clearance hole in the guard pill 80, thus traversing the front portion of the magnet bore occupied by the guard pill, and attaches to support structure 100 at the front aperture of the magnet bore before exiting through the aperture of the shield.

The guard pill occupies the front portion of the bore, and in a preferred embodiment it is made of gadolinium gallium garnet (GGG). The guard pill in the front portion has a clearance hole as a feed-through for the axial base connector. The axial guard connector, a thermally conductive rod, which in a preferred embodiment is a ¼ inch OFHC copper rod, supports the guard pill and makes good thermal contact with the pill. The axial guard connector runs parallel to the axial base connector and attaches to support structure 100 at the front aperture before exiting through the aperture of the shield.

FIG. 2 suggests that the base pill has the shape of solid cylinder and that the guard pill has the shape of a solid cylinder with a bore. However, the base pill can be of any shape to fit the back portion of the bore, and the guard pill can be of any shape to fit the front portion of the bore, as long as the axial base connector can traverse the front portion of the magnet bore. The term traverse is used herein for passing through or around an object. In a preferred embodiment the axial base connector 71 runs parallel to and centered on the bore axis, and the axial guard connector 81 runs off axis and parallel to the axial base connector, but many alternate configurations can be used to accommodate the axial connector rods inside the bore.

An advantage of this design is that the positioning of the pills and the support of the pills from one side, the front aperture, optimizes the volume available to the base pill and to the guard pill. The division of the bore volume between the two pills can be tailored to the application.

The absence of the thermally conductive cylinder 31 (refer to FIG. 1) inside the bore in the design of Hagmann and Richards reduces the chance of accidental mechanical thermal contact inside the bore of the magnet. The elimination of this cylinder in the design described here simplifies the assembly inside the bore and eases the constraints on the rigidity of the support.

Since the support structure of this invention can be assembled and aligned first, outside the magnet on a bench, the alignment of the base pill 70 to the guard pill 80 can be separate from the alignment of the entire two-pill assembly inside the magnet bore, thus simplifying the overall alignment procedure. The support structure preferably uses pre-aligned and preassembled support modules to be described below, which further simplify alignment. The design can be extended to a three or more pill assembly, either with all the pills supported through the front aperture, or with two pills supported as shown through the front aperture and additional pill or pills supported through the back.

The preferred support structure thermally isolates the pills. The base pill assembly comprising the base pill and the axial base connector is suspended from the guard pill assembly comprising the guard pill and the axial guard connector with a first low thermal conductivity material, which in a preferred embodiment is a type 29 Kevlar string. The guard pill assembly comprising the guard pill and the guard connector is suspended from the thermal ground with a second low thermal conductivity material, which in a preferred embodiment is a type 29 Kevlar string.

The magnetic shield 90 and the superconducting magnet 60 are at a temperature of 4K, the starting temperature of the ADR's cooling cycle, and act as the thermal ground. In a preferred embodiment a set of mechanical heat switches (not shown) clamp the base pill assembly and the guard pill assembly to the starting temperature. While the pill assemblies remain connected to the heat reservoir of the thermal ground, the field of the superconducting magnet is ramped up to a maximum magnetic induction of about 4 Tesla. The heat switches are then opened, thus isolating the pill assemblies individually. When the magnetic field is then reduced, the pills and their assemblies cool. At a maximum field of about 4 Tesla and a base pill made of FAA and a guard pill made of GGG, temperatures of about 50 mK and 1K respectively can be reached. In the preferred embodiment of this ADR as a refrigerator for an x-ray detector, a base temperature of 100 mK is chosen and held for 24 hours and more.

The preferred support structure uses support modules to thermally isolate the base pill assembly and the guard pill assembly. The module comprises base, guard and ground members which attach to the base pill, the guard pill and the thermal ground, respectively. The base member attaches to the guard member with low conductivity material, and the guard member attaches to the ground member with low conductivity material. The base member has no direct contact with the ground member. The module can be planar or three dimensional. In the three dimensional embodiment, pill motion is constrained in three dimensions with a rigidity that depends on the length of the members in each dimension. The planar module has all three elements essentially in a single plane, and constrains motion only in two dimensions, so multiple modules are employed.

Figure 3A:
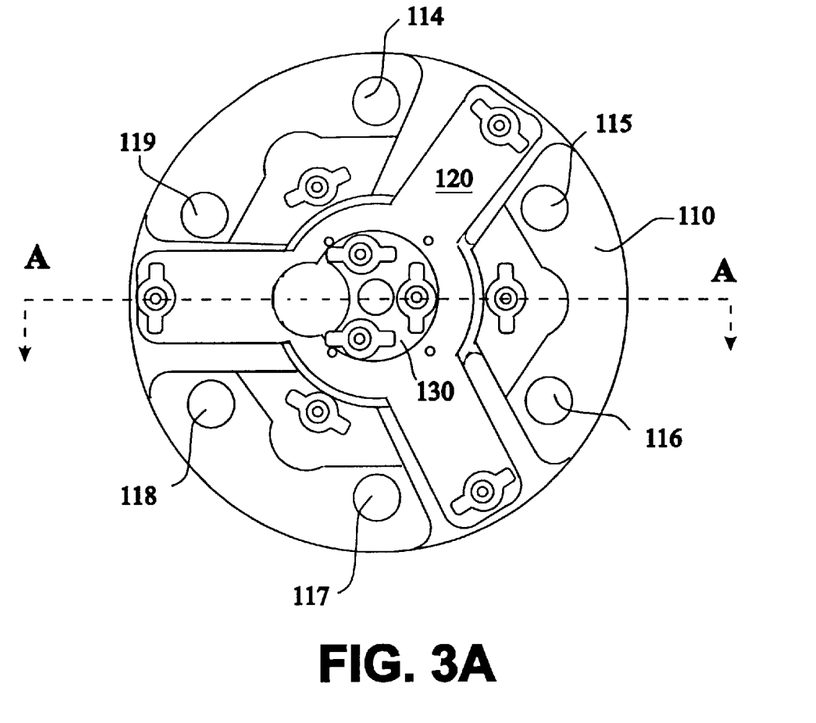
Figure 3B:
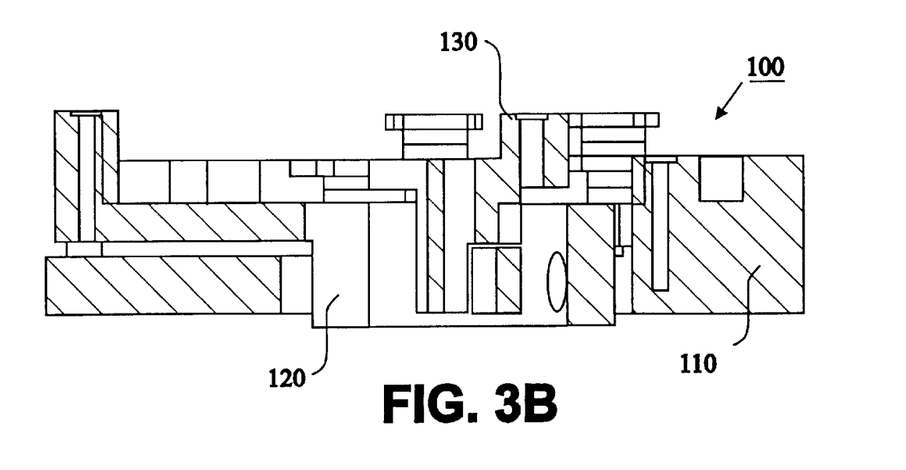

In a preferred embodiment four planar support modules are used. The result is a stiff support for the two pills. The design of the members of the pre-assembled and structurally independent planar support module are shown in FIGS. 3a–b and in FIGS. 4a–d. FIGS. 5a–b show the assembled planar support module, that is to say the base member, the guard member and the ground member are connected by Kevlar strings.

FIGS. 3a–b show the planar support module with its nested and aligned members. The cross section in FIG. 3b along AA of FIG. 3a shows the flat profile of the planar support module.

Figure 4A:
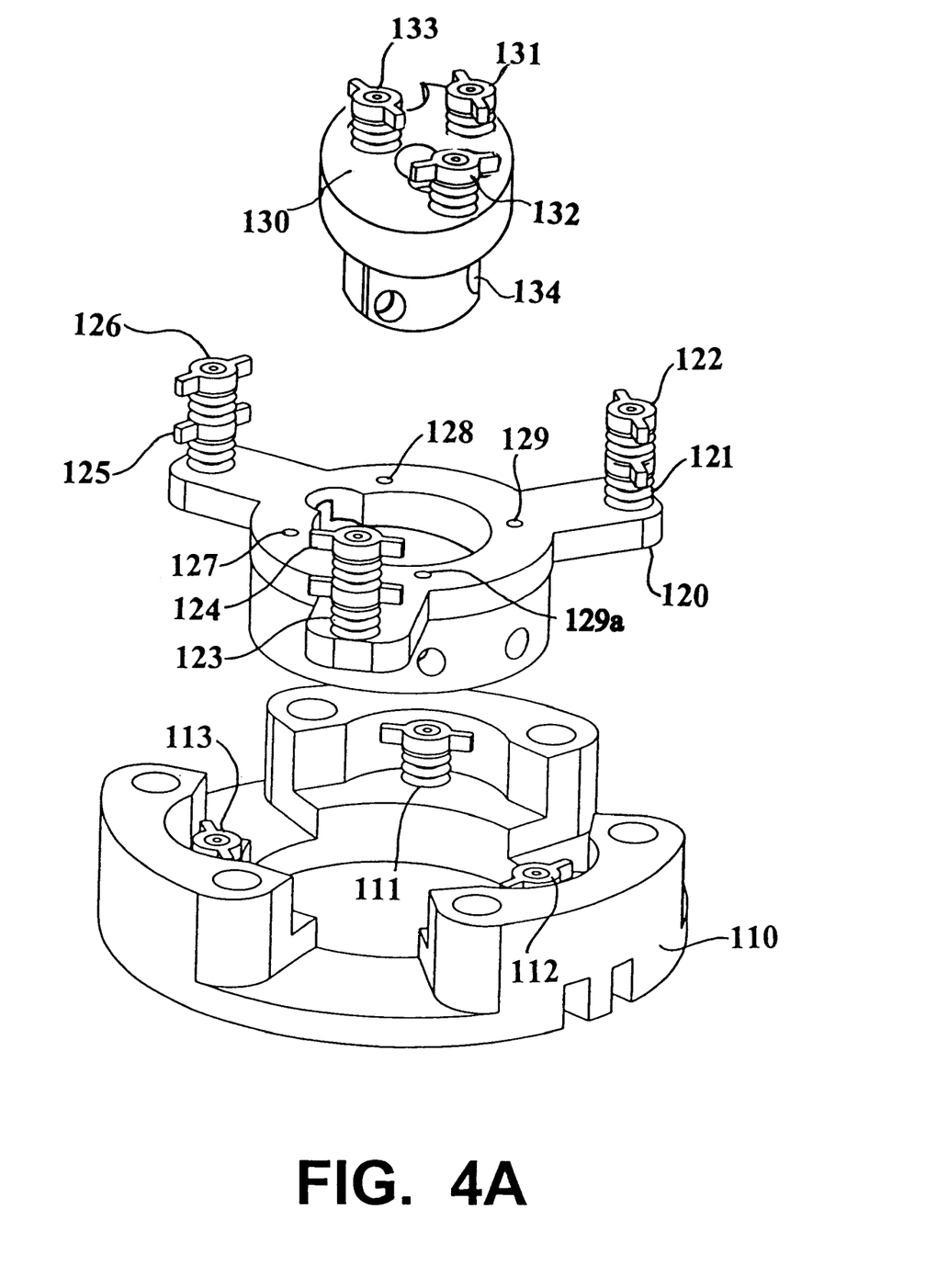
FIG. 4a shows an exploded view of the members in a three dimensional rendering where the three members of the planar support module have been displace along the axis defined by the center of the circularly shaped outer member.
Figure 4B:
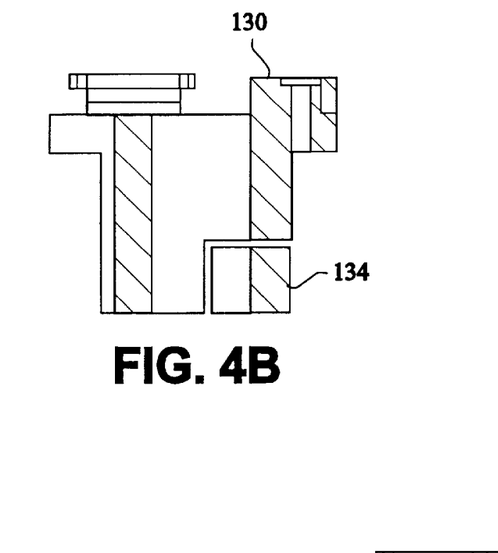
FIGS. 4b, 4c, and 4d show the cross section of the three members of the planar support module.
Figure 4C:
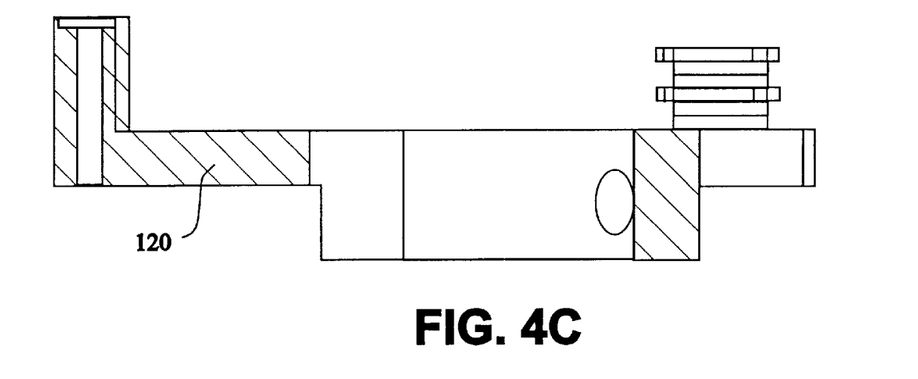
Figure 4D:
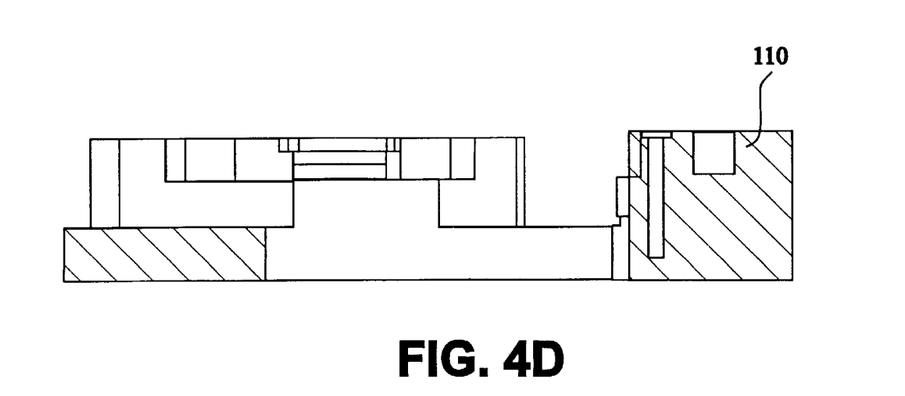
Figure 5A:
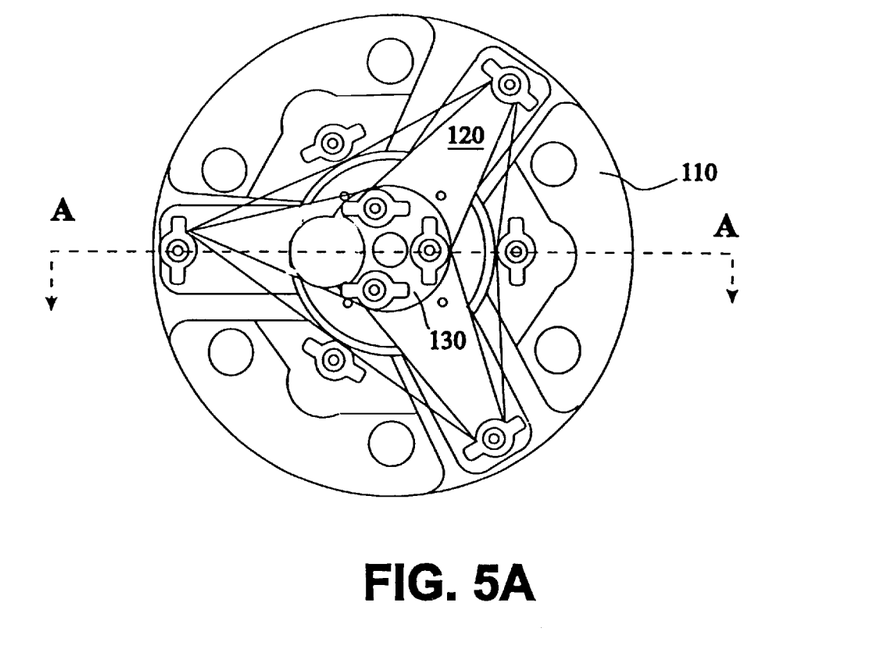
FIG. 5a shows a plan view and FIG. 5b a three dimensional view.
Figure 5B:
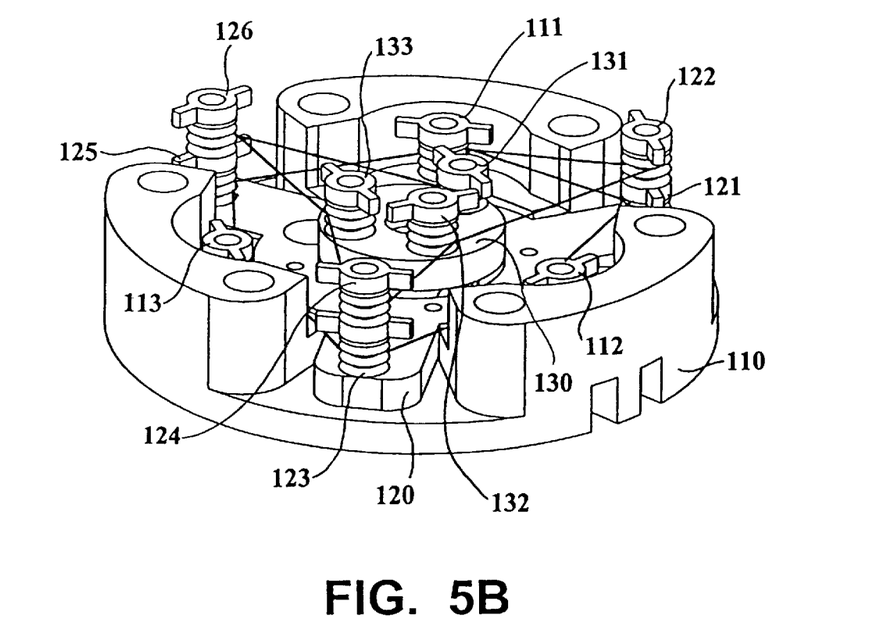

The nested members of the planar support module are shown in FIG. 4a in an exploded view, where the members have been displaced along an axis defined by the center of the circularly shaped ground member. The ground member 110 is adapted to be in thermal contact with the ADR's thermal ground. The ground member provides clearance holes (114 through 119 in FIG. 3a) which allow the member to be bolted to the thermal ground. The ground member is preferably made of aluminum.

The guard member 120 is adapted to be in thermal contact with the guard pill assembly through a guard member clamp (not shown) which bolts via threaded holes (127 through 130 in FIG. 4a) to the underside of the guard member, where the underside is the side of the guard member opposite to the side holding the capstans (121 through 126 in FIG. 4a). The large clearance hole in the center of the guard member is extended further into one arm of the guard member by an adjacent cutout which overlaps with the clearance hole. This is to accommodate the axial guard connector rod (of the guard pill assembly) attached to the guard member with the guard member clamp and running through the planar support module. The guard member is preferably made of titanium and the guard member clamp is preferably made of gold plated OFHC copper.

The base member 130 is adapted to be in thermal contact with the base pill assembly. The base member is designed to clamp onto the axial base connector rod (of the base pill assembly) with clamp 134. A cutout on the circumference of the base member clears the axial guard connector rod. The base member is preferably made of brass.

Capstans on all three members provide attachment points for the Kevlar strings connecting the members. Referring to FIGS. 4a and 5b, there are three capstans 111, 112, 113 on the ground member, six capstans 121 through 126 on the guard member, and three capstans 131, 132, 133 on the base member. These capstans are cylinders with a bore in the center, having a groove running on the outside surface of the cylinder, and two small arms. A set screw (not shown) clears the bore of the capstans and threads into threaded holes in the members at the location of the capstans. The capstans are free to rotate until the set screws are tightened down. The placement of the capstans, particularly on extending arms of the guard member, is designed to increase the length of the Kevlar strings, thereby decreasing the thermal conductance. In a preferred embodiment the capstans are made of titanium and the set screws are made of brass.

The aligned nested members of the planar support module are shown in FIGS. 3a–b. FIG. 3a shows a plan view of the planar support module. FIG. 3b shows the cross section AA of FIG. 3a of the aligned nested members.

The members of the planar support module are aligned in a special assembly jig (not shown). The alignment is described next. First the ground member is bolted to the jig using the six clearance holes (114 through 119 in FIG. 3a). The guard member is aligned with the guard member clamp removed. It is held to the jig using the guard member's four threaded holes (127 through 130). The guard member alignment is as shown in FIG. 3a–b. The guard member is separated from the ground member by a gap such that the guard member makes no mechanical contact with the ground member. The capstans 111,112,113 of the ground member and the capstans 121,123,125 of the guard member are at the same height. These capstans define the first string plane.

The base member's own clamp 134 is used to attach the base member to the jig. The base member 130 is aligned with respect to the guard member 120 (as shown in FIG. 3a) such that the cutout in the guard member and the cutout in the base member create a circular clearance hole for the connector rod of the guard pill assembly, and that the capstans 131, 132, 133 of the base member and the capstans 122, 124, 126 of the guard member are at the same height. These capstans define the second string plane. The base member makes no mechanical contact with the guard member or the ground member.

In the assembly jig the members of the planar support module are aligned and firmly held in place. The members are now ready to be assembled. The first low conductivity material, hereafter referred to as the first string, stringing the capstans of the first string plane is type 29 Kevlar string. In a preferred embodiment the stringing method of the first string plane is as follows. One single string is used and the string starts and ends at the same capstan. In FIG. 5a–b this is capstan is 125. 125 (and 126) are fixed by tightening their set screw, all other capstans are free to rotate. The Kevlar string is tied to capstan 125 (as indicated) and then makes one and three-quarter clockwise (cw) wraps in 125's groove. The string then runs to capstan 113 and makes one wrap (cw) in 113's groove. The string then runs to capstan 123 and makes one and one-quarter wraps (ccw) in 123's groove. The string then runs to capstan 112 and makes one wrap (cw) in 112's groove. The string then runs to capstan 121 and makes one and one-quarter wraps (ccw) in 121's groove. The string then runs to capstan 111 and makes one wrap (cw) in 111's groove. The string then returns to capstan 125, where it makes one and one-half wraps (ccw) in 125's groove before the string is tied to the same arm of 125, where the first string started.

The second low conductivity material, hereafter referred to as the second string, stringing the capstans of the second string plane is type 29 Kevlar string. The stringing method of the second string plane is analogous to the first plane. The attachment of the string to capstan 126 is like the attachment to 125; the string makes one wrap (ccw) in the groove of capstans 133,132,131 and one and a half wraps (ccw) in the groove of capstans 124 and 122.

The tension in the first string is equalized everywhere in the first string plane and increased to 25% of the breaking strength of type 29 Kevlar. Likewise the tension in the second string is equalized everywhere in the second string plane and increased to 25% of the breaking strength of type 29 Kevlar by simple techniques know to those skilled in the art. Then set screws on all capstans are tightened and glue. In a preferred embodiment this is Stycast epoxy, and is painted on the knots and string crossings on the capstans. After the epoxy has cured the planar module can be removed from the jig and the guard member clamp is screwed to the underside of the guard member. This completes the alignment and assembly of the planar support module. The aligned and assembled planar support module is a structurally independent unit and can be used in many applications which require thermal isolation and stiff mechanical support. The support module can include a fourth (or more) member to support a third (or more) pill. The member can nest between two other members and be attached with Kevlar strings to the adjacent members.

The alignment and assembly of the planar support module is a straightforward procedure for anyone skilled in the art and the results are highly reproducible. The base, inner and guard members can be provided by the manufacturer unassembled, and the user can string the members together. Each member is adapted to be in thermal contact with a heat reservoir, meaning the members have a clamp, bolt hole, or other mechanical element to connect to a thermal reservoir (a pill or thermal ground) either directly or through an additional connector, such as a rod. The members are adapted to be connected to one another with a low thermal conductivity material, meaning that they have connection points such as capstans by which to attach a material such as Kevlar.

The members of the planar support module are extremely rigid in the string planes. The planar support modules are not designed to constrain motion along the axis perpendicular to the string planes and hence little support is provided in that direction, but multiple planar support modules can easily be combined to fit any application. An example is the two-pill ADR support described in this text.

Figure 6:
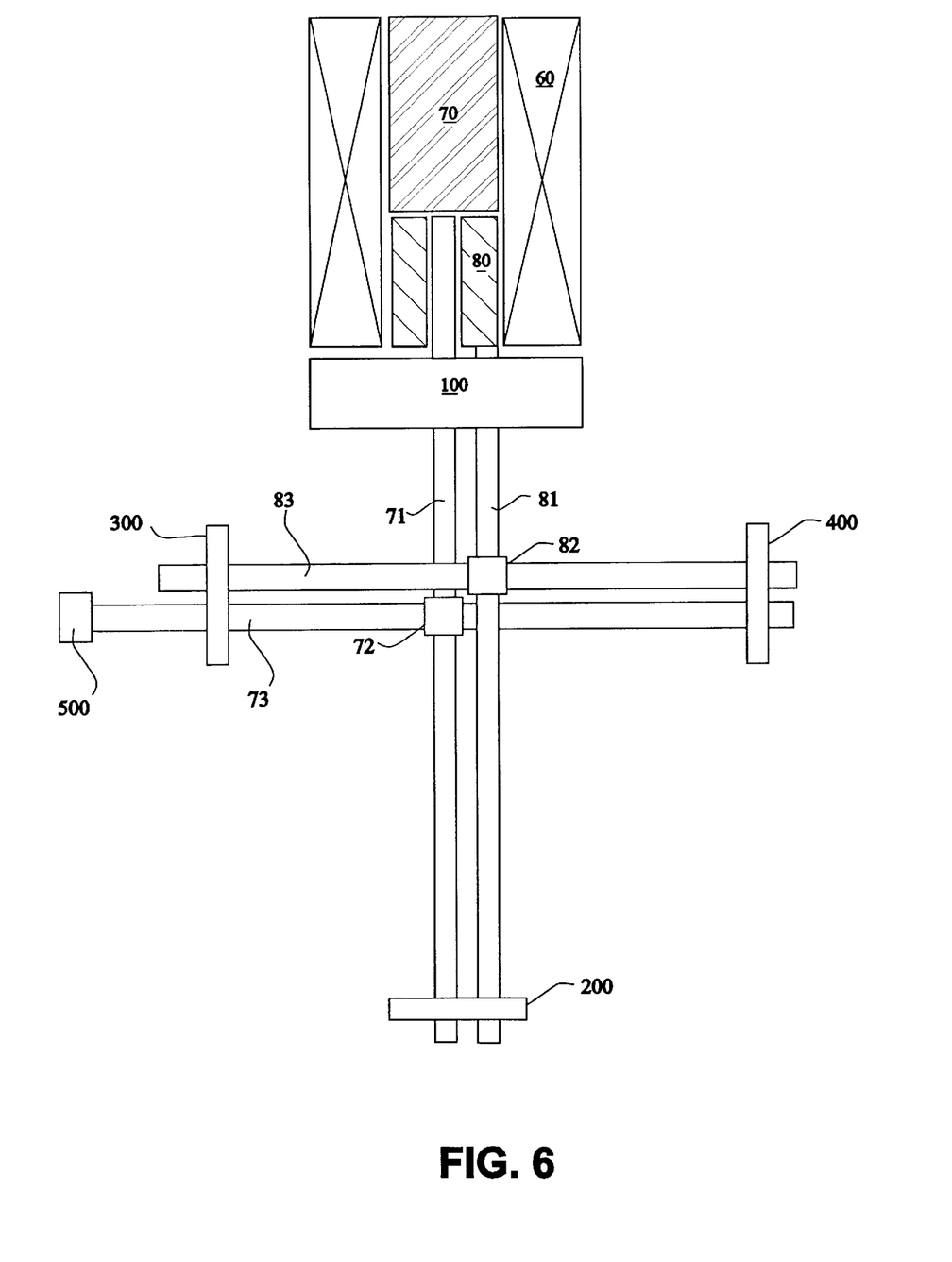
FIG. 6 shows a schematic diagram of the improved mechanical support for a two-pill Adiabatic Demagnetization Refrigerator using multiple planar support modules.

FIG. 6 shows a schematic diagram of the preferred embodiment of the support structure for a two-pill adiabatic dilution refrigerator using four support modules. For simplicity the magnetic shield (90 of FIG. 2) is not shown. It is also implied that the thermal ground comprising the magnet and the shield is adapted to provide means of attaching the ground members of the support modules with good thermal contact.

The support of the base pill 70 utilizes the four planar support modules (100 and 200, and 300 and 400). The axial base connector 71 is attached with good thermal contact to the base pill, and the clamps of the base members of modules 100 and 200. A thermally conductive rod 73, the cross base connector is connected to 71 by a thermally conductive joint 72, the base joint, with good thermal contact to the base connector 71. The cross base connector is connected with good thermal contact to the clamps of the base members of modules 300 and 400. This assembly comprising the base pill 70, the connector rods 71 and 73, and the joint 72 form a cross like structure and is termed the base pill assembly. The planar support modules 100 and 200 restrict motion of the base pill assembly in the plane perpendicular to the axis of the magnet bore, and the planar support modules 300 and 400 restrict the motion of the base pill assembly along the axis of the bore.

The support of the guard pill 80 utilizes the four planar support modules 100 and 200, and 300 and 400. The axial guard connector 81 is attached with good thermal contact to the guard pill and to the guard member clamps of the guard members of modules 100 and 200. A thermally conductive rod 83, the cross guard connector is connected to 81 by a thermally conductive joint 82, the guard joint, with good thermal contact to the axial guard connector 81. The cross guard connector is connected with good thermal contact to the guard member clamps of the guard members of modules 300 and 400. This assembly comprising the guard pill 80, the connector rods 81 and 83, and the joint 82 form a cross like structure and is termed the guard pill assembly. The planar support modules 100 and 200 restrict motion of the guard pill assembly in the plane perpendicular to the axis of the magnet bore, and the planar support modules 300 and 400 restrict the motion of the guard pill assembly along the axis of the bore.

The joints 72 and 82 are simple pieces which provide mechanical and thermal contact between the axial and cross connector rods of one pill assembly while preventing contact with the connector rods of the other pill assembly. In a preferred embodiment those joints are made of OFHC copper for good thermal contact among the connector rods.

In the preferred embodiment of this ADR as an x-ray detector refrigerator, an x-ray detector 500 is place on cross base connector 73 which acts as a cold finger of the refrigerator. Other base connector rods can also have cold stages.

Although four modules are preferred for added stability, three are adequate to constrain all degrees of freedom. Module 400 can be eliminated, leaving a tee rather than a cross structure.

The assembly of the entire two pill assembly comprising the base pill assembly and the guard pill assembly is fast and easy, because the planar support modules are pre-aligned, preassembled and independent units. The assembly of the entire support structure is therefore merely a matter of connecting the components, that is the rods, joints and modules. By aligning and assembling the planar support modules in the jig, the task of aligning the support structure has been separated from the actual task of assembling it.

Maintaining the tension of the strings is required for mechanical rigidity. When cooled to 4K and below, Kevlar expands by about 0.1% (for type Kevlar 29) but metals such as brass, Al and Cu contract by 0.4%. Both factors work together to result in decreased string tension. In the support module of this invention, this is countered by the use of a metal having a lower coefficient of shrinkage for the member having the outer attachment points so that the relatively greater shrinkage of the inner member tensions the strings. Titanium, which contracts by only 0.15%, is a suitable metal.

Since there are three members of the support module, the difference in metal shrinkage can best be exploited by using the lower shrinkage metal on the center member, the guard member, which has Kevlar connections to both the base member and the ground member, and having the attachment points on the guard member offset from the center to a distance greater than either the base member or ground member connection points. The base member and the ground member are of metals having greater shrinkage than the guard member, preferably copper and aluminum, respectively. As shown in FIG. 5a–b, by placing the guard member attachment points on radial arms, they extend beyond the base and ground member attachment points, and relatively greater contraction by the base and ground members upon cooling increases the tension on the Kevlar strings.

The two pill assembly and the support module have been illustrated with specific embodiments which are illustrative but not limiting. Many variations and applications will be obvious to those skilled in the art, and fall within the range and scope of this invention. For example, the two-pill assembly has been illustrated with one connector rod attached to each pill. Multiple rods can be used. Cylinders or other shaped supports can be used instead of rods. The base axial connector has been illustrated connected to the center of the base pill. It can be connected to the side and can go around rather than through the guard pill. The support structure has been illustrated with four planar support modules attached to crossed connector rods. Fewer than four modules can be used. The crossing connector rods can cross at angles other than 90°. The support structure has been illustrated with planar modules. A single, or multiple, three dimensional module can be used. Independent pre-assembled modules have been illustrated. The two pill assembly can alternatively be assembled and aligned as a unit, rather than having separately assembled modules. The assembly and the support module have been illustrated with two pills. The design principles taught herein can be extended to assemblies having three or more pills.

The planar modules have been illustrated in a particular embodiment having circularly shaped nesting members. Other shapes can be used and they can fit together in other ways. The number and placement of features such as clearance holes, screw holes and attachment points can be changed. The attachment points have been illustrated with rotatable capstans. Other connectors can be used, as can other stringing configurations. An assembly jig is useful for aligning and tensioning the members, but is not required.

Material choices which give long term stability throughout the temperature cycle have been given. Other materials can be used which follow the expansion compensation teaching of this invention. Depending on the required lifetime and the alignment tolerance, non-compensating materials can be used.

I claim:

1. A two pill assembly adapted to position at least two pills within the bore of a magnet, said assembly requiring access to and utilizing only one bore aperture, said bore having a front aperture and back aperture, the volume of said bore having a front portion adjacent to said front aperture and extending into the magnet, and a back portion adjacent to said back aperture and extending into the magnet and abutted on said front portion, said assembly comprising:
   a support structure adapted to be positioned outside of and proximate to said front aperture;
   a guard pill adapted to be positioned in said front portion;
   an axial guard connector attached to said guard pill and attached to said support structure;
   a base pill adapted to be positioned in said back portion;
   an axial base connector attached to said base pill, traversing said guard pill and attached to said support structure.

2. The two pill assembly of claim 1 wherein said support structure comprises a base member attached to said axial base connector, a guard member attached to said axial guard connector, and a first low thermal conductivity material connecting said base member to said guard member.

3. The two pill assembly of claim 2 wherein said support structure further comprises a ground member adapted to be attached to thermal ground, and a second low thermal conductivity material connecting said ground member to said guard member.

4. The two pill assembly of claim 3 wherein said ground, guard and base members form a first planar support module.

5. The two pill assembly of claim 4 wherein said support structure comprises a plurality of planar support modules.

6. The two pill assembly of claim 4 wherein said support structure further comprises a second planar support module attached to said axial base and guard connectors.

7. The two pill assembly of claim 6 wherein said support structure further includes a cross base connector attached to said axial base connector, a cross guard connector attached to said axial guard connector, and a third planar support module attached to both said cross base connector and said cross guard connector.

8. A low temperature support module comprising:
   a base, a guard, and a ground member;
   said base member adapted to be in thermal contact with a heat reservoir at base temperature;
   said guard member adapted to be in thermal contact with a heat reservoir at guard temperature;
   said ground member adapted to be in thermal contact with the thermal ground at ground temperature;
   said base and guard members adapted to be connected by a first low thermal conductivity material; and
   said guard and ground members adapted to be connected by a second low thermal conductivity material.

9. The support module of claim 8 wherein said support module is a planar support module.

10. The support module of claim 9 wherein said base member nests inside said guard member and said guard member nests inside said ground member.

11. The support module of claim 8 wherein said base member comprises a base member clamp for connecting to said base temperature reservoir and wherein said guard member comprises a guard member clamp for connecting to said guard temperature reservoir.

12. The support module of claim 8 wherein said base and guard members each comprise a plurality of attachment points for connecting with said first low conductivity material and wherein said ground and guard members each comprise a plurality of attachment points for connecting with said first low conductivity material.

13. The support module of claim 12 wherein said guard member attachment points are radial displaced from center more than both said ground member attachment points and said base member attachment points.

14. The support module of claim 8 wherein said guard member shrinks less with cooling than said base member.

15. The support module of claim 14 wherein said guard member is titanium and said ground member is selected from the group consisting of Al, Cu and brass.

16. The support module of claim 14 wherein said guard member shrinks less with cooling than said ground member, and wherein said ground and guard members each comprise a plurality of attachment points for connecting with said first low conductivity material, and wherein said guard member attachment points are radial displaced from center more than said ground member attachment points.

17. The support module of claim 16 wherein said guard member is titanium and said base and ground members are selected from the group consisting of Al, Cu and brass.

18. The support module of claim 17 wherein said base member is made of copper, said guard member is made of titanium and said ground member is made of aluminum.

19. A preassembled support module comprising the support module of claim 8 and further comprising a first low thermal conductivity material connecting said base and guard members, and a second low thermal conductivity material connecting said guard and ground members.

20. An assembly jig for assembling the support module of claim 8, comprising means for aligning said base, guard and ground members and means for securing during assembly said base, guard and ground members.

* * * * *

UNITED STATES PATENT AND TRADEMARK OFFICE
CERTIFICATE OF CORRECTION

PATENT NO. : 5,934,077
DATED : August 10, 1999
INVENTOR(S) : Martinis

It is certified that error appears in the above-identified patent and that said Letters Patent is hereby corrected as shown below:

At column 7, line 60, please delete "130" and replace with --129a--.

At column 8, line 40, please delete "130" and replace with --129a--.

Signed and Sealed this

Twenty-eighth Day of March, 2000

Attest:

Q. TODD DICKINSON

*Attesting Officer*     *Commissioner of Patents and Trademarks*